United States Patent
Ghosh et al.

(10) Patent No.: US 9,944,825 B2
(45) Date of Patent: Apr. 17, 2018

(54) FLAME RETARDANT TEXTILE

(71) Applicant: EASTERN MICHIGAN UNIVERSITY, Ypsilanti, MI (US)

(72) Inventors: Subhas Ghosh, Ypsilanti, MI (US); Vijaykumar M. Mannari, Saline, MI (US); Vikas P. Joshi, Ypsilanti, MI (US)

(73) Assignee: EASTERN MICHIGAN UNIVERSITY, Ypsilanti, MI (US)

( * ) Notice: Subject to any disclaimer, the term of this patent is extended or adjusted under 35 U.S.C. 154(b) by 938 days.

(21) Appl. No.: 14/167,264

(22) Filed: Jan. 29, 2014

(65) Prior Publication Data
US 2014/0213131 A1 Jul. 31, 2014

Related U.S. Application Data

(60) Provisional application No. 61/758,469, filed on Jan. 30, 2013.

(51) Int. Cl.
C09D 185/02 (2006.01)
C09D 185/00 (2006.01)

(52) U.S. Cl.
CPC ......... *C09D 185/02* (2013.01); *C09D 185/00* (2013.01); *Y10T 442/20* (2015.04); *Y10T 442/2648* (2015.04); *Y10T 442/277* (2015.04); *Y10T 442/2762* (2015.04); *Y10T 442/2861* (2015.04); *Y10T 442/2926* (2015.04)

(58) Field of Classification Search
USPC ........ 442/138, 152, 164, 172, 153; 524/588; 556/405
See application file for complete search history.

(56) References Cited

U.S. PATENT DOCUMENTS

2012/0258319 A1 10/2012 Mannari
2012/0330038 A1* 12/2012 Terada .................... C07B 53/00
549/479

FOREIGN PATENT DOCUMENTS

WO WO 2012134788 * 10/2012 .............. C08L 83/04

OTHER PUBLICATIONS

Chen D.Q., Wang Y.Z., Hu X.P., Wang D.Y, Qu M.H., and Yang B., "Flame-Retardant and Anti-Dripping Effects of a Novel Char-Forming Flame Retardant for the Treatment of Poly(ethylene terephthalate) Fabrics," *Polym. Degrad. Stab.*, 88:349-56 (2005).

* cited by examiner

*Primary Examiner* — Lynda Salvatore
(74) *Attorney, Agent, or Firm* — Marshall, Gerstein & Borun LLP

(57) ABSTRACT

The disclosure relates to curable polysilyl phosphate compounds and compositions as well as related methods and flame-retardant textiles incorporating the same. Curable polysilyl phosphate compounds according to the disclosure include a hydrocarbon moiety comprising at least one phosphate group and more than two hydrolysable silyl groups linked to the hydrocarbon moiety. In some embodiments, the hydrocarbon moiety is derived from spirocyclic pentaerythritol diphosphoryl chloride. The curable polysilyl phosphate compound can applied to a textile substrate and then cured to provide a flame-retardant textile with the cured polysilyl phosphate compound as a coating bonded to the textile substrate.

19 Claims, 2 Drawing Sheets

Treated Cotton Substrate | Untreated Cotton Substrate

FLAME RETARDANT TEXTILE

CROSS REFERENCE TO RELATED APPLICATION

Priority is claimed to U.S. Provisional Application No. 61/758,469 (filed on Jan. 30, 2013), which is incorporated herein by reference in its entirety.

STATEMENT OF GOVERNMENT INTEREST

None.

BACKGROUND OF THE DISCLOSURE

Field of the Disclosure

The disclosure generally relates to curable polysilyl phosphate compounds and compositions as well as related methods and flame-retardant textiles incorporating the same.

Brief Description of Related Technology

Textile fabrics, like any other solid substrates, experience a rise in temperature when exposed to the heat source. Textile substrate catches fire when the substrate reaches the ignition temperature and initiates the pyrolytic decomposition of the fiber material in textile substrate. The possible products of this pyrolytic reaction are combustible gases, non-combustible gases, and carbonaceous char. These combustible gases mix with the oxygen in air and produce flame.

Flame retardants were developed to minimize financial and life losses that occurred due to fire. These flame retardants have the following major actions in case of fire: 1. The flammability of textile material is reduced and hence the product ignites less easily under the influence of heat source. 2. The flame spread is reduced in case there is ignition of textile substrate. This gives higher escape times from buildings and fire premises in case of fire.

There are several requirements for safety of apparel and furnishing textiles. Some of them include: 1. Safety: In daily life situations, personal and organizational losses occur due to fire where furniture, wall coverings, curtains, and industrial fabrics act as fuel. These losses due to fire can be minimized by using textiles coated with fire retardant finish. 2. Federal law: It is federally mandatory that certain home furnishings and children clothing have certain degree of flame retardancy in them. Hence these classes of textiles must be treated with suitable flame retardant finishes.

Flame retardancy has been an area of keen interest among researchers and industrialists, and considerable work has been undertaken since early 1990 to investigate the behavior of intumescent in textile structures. The current established intumescent chemistry has few drawbacks and has few issues which need to be addressed.

The current flame retardant chemistry is mainly dominated with the use of brominated diphenyl oxide flame retardants and other halogen-based flame retardants. The European community (EC) and the US government have expressed concerns about formation of potentially carcinogenic and highly toxic substances during combustion of these halogen based flame retardants. Dermal exposure of halogen-based flame retardants may cause local irritation to skin, acute to long-term toxicity, genotoxicity, and mutagenicity.

SUMMARY

This disclosure aims at developing an eco-friendly flame retardant textile fabric using non-halogenic phosphorous-based intumescence chemistry. In an embodiment, phosphorous in the structure of spirocyclic pentaerythritol diphosphoryl chloride (SPDPC) acts as the main group to impart flame retardancy. Intermediate compounds were synthesized using a unique procedure and finally converted into a bis-silane sol. The bis-silane sol was applied to textile material using a pad-dry-cure method. The intermediate compounds and the coated material were tested using Fourier transform infrared spectroscopy (FTIR), differential scanning calorimeter (DSC), and thermogravimetric analysis (TGA) testing instruments. Vertical flammability testing was performed as per ASTM D-6413 standards to test the fabric for its flame retardancy. Tensile testing of the coated fabric was performed as per ASTM D5035 standards. Change in thickness of the coated fabric was measured as per ASTM B499 test method. The results indicate that the phosphorous based intumescence chemistry is effective in imparting flame retardancy to the cotton textile substrate, while the silane functionality provides a means for both forming the flame-retardant polymeric textile coating and attaching the same to the textile substrate in a particularly stable, wash-resistant manner.

A textile substrate catches fire when the substrate reaches its ignition temperature and initiates the pyrolytic decomposition of the fiber material in textile substrate. The possible products of this pyrolytic reaction are combustible gases, non-combustible gases, and carbonaceous char. These combustible gases mix with the oxygen in air and produce flame. It is federally mandated that certain home furnishings and children clothing have a certain degree of flame retardancy in them. Hence these classes of textiles must be treated with suitable flame retardant finishes. However, most all effective fire retardant textile finishes have adverse effects on health and the environment since halogen-containing compositions are often used as the fire retardant agents. The current disclosure provides a halogen-free, effective fire retardant finish to various textile fabric substrates.

In one aspect, the disclosure relates to a curable polysilyl phosphate composition comprising: (a) a curable polysilyl phosphate compound represented by the following structure (I):

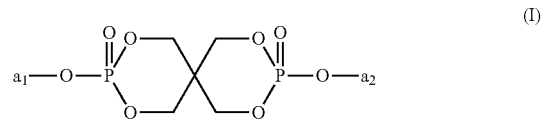

wherein: (i) $a_1$ and $a_2$ are the same or different and each is represented by the following structure (II):

(ii) $A_1$ is represented by $-R_1-Si(R_4)_{3-y}X_y$; (iii) $A_2$ is represented by $-R_2-Si(R_4)_{3-z}X_z$ or H or $R_4$; (iv) X is a hydrolysable group independently selected from the group consisting of alkoxy groups, aryloxy groups, carboxyloxy groups, halogens, and combinations thereof; (v) $R_1$, $R_2$, and $R_3$ are independently selected from the group consisting of hydrocarbons containing from 1 to 20 carbon atoms and heteroatom-substituted hydrocarbons containing from 1 to 20 carbon atoms; (vi) $R_4$ is independently selected from the group consisting of H, hydrocarbons containing from 1 to 20 carbon atoms, and heteroatom-substituted hydrocarbons containing from 1 to 20 carbon atoms; (vii) y is 1,2, or 3; (viii) z is 1, 2, or 3 when $A_2$ is not H or $R_4$; and (ix) the curable polysilyl phosphate compound has a number of hydrolysable groups X of at least 4 (e.g., X ranging from 6 to 12). In a refinement, (i) $A_1$ is —$C_3H_6$—Si(OCH$_3$)$_3$ or —$C_3H_6$—Si(OC$_2H_5$)$_3$; (ii) $A_2$ is H; and (iii) $R_3$ is —$C_2H_4$—. In another refinement, the hydrolysable silyl groups X are selected from the group consisting of methoxy groups, ethoxy groups, and combinations thereof. In an embodiment, the composition further comprises (b) oligomeric analogs to the curable polysilyl phosphate compound according to structure (I) (e.g., containing 2 to 10 spirocyclic pentaerythritol bisphosphorate linked together via hydrocarbon groups such as $R_3$ and having terminal $a_1$ and $a_2$ groups at opposing ends of the oligomeric chain).

In another aspect, the disclosure relates to a curable polysilyl phosphate or polysilyl phosphorous-containing compound comprising: (a) a hydrocarbon moiety comprising at least 1 phosphate group (e.g., a flame-retardant phosphate (PO$_4$) group such as where the three oxygen atoms single bonded to the phosphorous atom in the phosphate group (P(=O)(O.)$_3$) are linked to carbon atoms in (heteroatom-substituted) hydrocarbon groups containing 1 to 50 carbon atoms via covalent bonds (e.g., and not ionic bonds)) or other phosphorous-based flame retardant/intumescent group; and (b) more than 2 hydrolysable silyl groups linked to the hydrocarbon moiety (e.g., via one or more carbamate linking groups between the hydrocarbon moiety and the hydrolysable silyl groups, with or without further linking groups such as (heteroatom-substituted) hydrocarbon groups containing 1 to 50 carbon atoms). Suitably, the curable polysilyl phosphate compound is halogen-free (e.g., free or substantially free from added F, Cl, Br, I, and/or At).

Various refinements and extensions of the disclosed curable polysilyl phosphate compounds and compositions are possible. For example, the hydrolysable silyl groups can be selected from the group consisting of methoxy groups, ethoxy groups, and combinations thereof bound to one or more silicon atoms. In a refinement, the curable polysilyl phosphate compound has a number of hydrolysable silyl groups (e.g., X in the various illustrated structures) ranging from 4 to 24 (e.g., at least 4, 6, 8, 10, 12, or 16 and/or up to 8, 10, 12, 16, 20, or 24, including any of the foregoing as a discrete value in addition to a range boundary). In an embodiment, the hydrocarbon moiety comprises at least 2 phosphate or other phosphorous-based flame retardant/intumescent groups (e.g., containing at least 2, 3, or 4 and/or up to 4, 5, or 6 phosphate or other phosphorous-based flame retardant/intumescent groups, including any of the foregoing as a discrete value in addition to a range boundary) linked to one or more hydrocarbon groups containing from 1 to 50 carbon atoms and/or heteroatom-substituted hydrocarbon groups containing from 1 to 50 carbon atoms (e.g., (heteroatom-substituted) hydrocarbon groups containing at least 1, 2, 4, 8, or 12 and/or up to 4, 6, 8, 10, 20, 30, 40, or 50 carbon atoms; multiple (heteroatom-substituted) hydrocarbon groups can be covalently linked to the oxygen atoms single bonded to the phosphorous atom in the phosphate groups to provide links between the phosphate groups and/or attachment points for the hydrolysable silyl groups to the hydrocarbon moiety; similar values/ranges are suitable for the numbers of multiple (heteroatom-substituted) hydrocarbon groups as for the phosphate groups). In a refinement, (i) the hydrocarbon moiety is represented by —$R_a$—PO$_4$—$R_b$—PO$_4$—$R_a$— (e.g., $a_1$-$R_a$—PO$_4$—$R_b$—PO$_4$—$R_a$-$a_2$ representing the curable polysilyl phosphate compound as a whole, where $a_1$ and $a_2$ each contain one or more hydrolysable silyl groups such as described above); (ii) PO$_4$ are the phosphate groups; (iii) $R_a$ are the same or different hydrocarbon groups or heteroatom-substituted hydrocarbon groups providing attachment points for the hydrolysable silyl groups linked to the hydrocarbon moiety (e.g., carbamate-containing heteroatom-substituted hydrocarbon groups linking the phosphate groups to the hydrolysable silyl groups such as described above); and (iv) $R_b$ is a hydrocarbon group or a heteroatom-substituted hydrocarbon group linking the phosphate groups together (e.g., a neopentyl (C(CH$_2$.)$_4$ group or other tetravalent (heteroatom-substituted) hydrocarbon group forming a spirocyclic structure in combination with two oxygen atoms from each phosphate group). In another embodiment, the curable polysilyl phosphate compound has a structure corresponding to a reaction product resulting from reaction of a bis-dipolyol spirocyclic pentaerythritol bisphosphorate (BSPB) with an isocyanato silane (e.g., (3-isocyanatopropyl)trimethoxysilane and (3-isocyanatopropyl)triethoxysilane as illustrative suitable (ω-isocyanatoalkyl)alkoxysilanes such as with alkyl and alkoxy groups having at least 1 or 2 and/or up to 4, 6, 8, or 10 carbon atoms; alkyl polyols having at least 1 or 2 and/or up to 4, 6, 8, or 10 carbon atoms such as ethylene glycol, propylene glycol, diethylene glycol, butanediol (as illustrative diol polyols), and glycerol (as an illustrative triol polyol); BSPB can be formed from reaction of one or more different polyols with spirocyclic pentaerythritol bisphosphorate disphosphoryl chloride (SPDPC)).

In further refinements, the curable polysilyl phosphate compound can have a structure derived from spirocyclic pentaerythritol diphosphoryl chloride (or other suitable leaving group). For example, the hydrocarbon moiety can comprise the following structure (III):

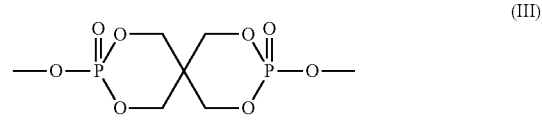

(e.g., where the free oxygen bonds represent linking points for at least one hydrolysable silyl group (each) attached directly or indirectly to the hydrocarbon moiety, such as by (heteroatom-substituted) hydrocarbon groups such as described above and also forming a portion of the hydrocarbon moiety). In another embodiment, (i) the curable polysilyl phosphate compound is represented by the following structure (I):

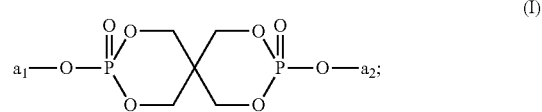

and
(ii) $a_1$ and $a_2$ are the same or different and each comprises at least 1 hydrolysable silyl group (e.g., each $a_1$ and $a_2$ contain at least 2, 3, 4, 5, 6, or 8 and/or up to 4, 5, 6, 8, 10, or 12 hydrolysable silyl groups and contain at least 1, 2, 3, or 4 and/or up to 2, 3, 4, 5, or 6 silicon atoms bonded thereto, including any of the foregoing as a discrete value in addition to a range boundary; $a_1$ and $a_2$ additionally can contain (heteroatom-substituted) hydrocarbon groups such as described above and also forming a portion of the hydrocarbon moiety and linking the hydrolysable silyl groups to phosphate-containing core of the hydrocarbon moiety/curable polysilyl phosphate compound). In a refinement of the foregoing, (i) each of $a_1$ and $a_2$ comprises a terminal hydrolysable silyl group represented by —Si(R$_4$)$_{3-y}$X$_y$; (ii) each X is a hydrolysable group independently selected from the group consisting of alkoxy groups, aryloxy groups, carboxyloxy groups, and halogens; (iii) each R$_4$ is independently selected from the group consisting of H, hydrocarbons containing from 1 to 20 carbon atoms, and heteroatom-substituted hydrocarbons containing from 1 to 20 carbon atoms (e.g., where the (heteroatom-substituted) hydrocarbons can have alternate carbon ranges as described above); (iv) y is 1, 2, or 3; and (v) $a_1$ and $a_2$ can be selected such that X, R$_4$, and y are the same or different between $a_1$ and $a_2$ provided that the total number hydrolysable groups X is more than 2. In yet a further refinement, each of $a_1$ and $a_2$ further comprises a carbamate linking group (e.g., —OC (=O)NH—; alternatively can comprise other groups that also are acid-stable linking groups suitable for low-pH, acid-catalyzed hydrolysis of the hydrolysable groups) between the respective phosphate group and terminal hydrolysable silyl group. In another refinement, (i) each of $a_1$ and $a_2$ is represented by the following structure (II):

    —R$_3$—O—C(=O)—NA$_1$A$_2$;    (II)

(ii) A$_1$ is represented by —R$_1$—Si(R$_4$)$_{3-y}$X$_y$; (iii) A$_2$ is represented by —R$_2$—Si(R$_4$)$_{3-z}$X$_z$ or H or R$_4$; (iv) X is a hydrolysable group independently selected from the group consisting of alkoxy groups, aryloxy groups, carboxyloxy groups, halogens, and combinations thereof; (v) R$_1$, R$_2$, and R$_3$ are independently selected from the group consisting of hydrocarbons containing from 1 to 20 carbon atoms and heteroatom-substituted hydrocarbons containing from 1 to 20 carbon atoms (e.g., where the (heteroatom-substituted) hydrocarbons can have alternate carbon ranges as described above); (vi) R$_4$ is independently selected from the group consisting of H, hydrocarbons containing from 1 to 20 carbon atoms, and heteroatom-substituted hydrocarbons containing from 1 to 20 carbon atoms; (vii) y is 1, 2, or 3; (viii) z is 1, 2, or 3 when A$_2$ is not H or R$_4$; and (ix) the number of hydrolysable groups X is more than 2 (e.g., where the hydrolysable groups X can have alternate ranges as described above). In a further refinement, (i) A$_1$ is —C$_3$H$_6$—Si(OCH$_3$)$_3$ or —C$_3$H$_6$—Si(OC$_2$H$_5$)$_3$; (ii) A$_2$ is H; and (iii) R$_3$ is —C$_2$H$_4$—.

In another aspect, the disclosure relates to a textile article comprising: (a) a textile substrate; and (b) a cured polysilyl phosphate compound as a coating on a surface of the textile substrate, the cured polysilyl phosphate compound coating comprising the hydrolysis and condensation reaction product of (A) a curable polysilyl phosphate composition or compound according to any of the foregoing embodiments, and (B) water; wherein: (i) at least some of the hydrolysable silyl groups of the curable polysilyl phosphate compound have been hydrolyzed with the water and condensed, thereby forming covalent intermolecular siloxane crosslinks between curable polysilyl phosphate compound molecules in the cured polysilyl phosphate compound coating; (ii) optionally, the cured polysilyl phosphate compound coating is sufficiently crosslinked with the intermolecular siloxane crosslinks to form a networked polymer; and (iii) the cured polysilyl phosphate compound is bonded to the textile substrate (e.g., adhered/bonded sufficiently to provide a wash-resistant coating on the textile substrate, which coating substantially remains and retains its flame-retardant properties subsequent to multiple washings in conventional media (such as water) and with conventional detergents otherwise applicable to the underlying textile substrate itself).

Various refinements and extensions of the disclosed textile articles are possible. For example, the textile substrate can be selected from the group consisting of animal textiles (e.g., protein-based fibers, including hair or fur such as wool, silk, etc.), plant textiles (e.g., cellulosic fibers; such as cotton, jute, flax, hemp, etc.), mineral textiles, synthetic textiles (e.g., polymeric fibers such as polyester, aramid, acrylic, polyamide (nylon), polyurethane, polyolefin, etc. fibers), and combinations thereof. In a refinement, the textile substrate comprises cellulosic fibers, for example one or more cellulosic fibers selected from the group consisting of cotton, jute, flax, hemp, sisal, ramie, straw, and bamboo. In another refinement, the cured polysilyl phosphate compound is bonded to the textile substrate via one or more of covalent bonds, hydrogen bonds, and van der Waals forces (e.g., bonding forces with the substrate can be between the silyl groups or other functional groups (e.g., carbamate linking groups) of the polysilyl phosphate compound). In another refinement, the cured polysilyl phosphate compound is covalently bonded to the textile substrate via a —SiO— functional group (e.g., a —SiOC— group such as resulting from a condensation from a —SiOH silanol group in an at least partially hydrolyzed curable polysilyl phosphate compound and a —COH hydroxyl/alcohol group, such as may be present as a surface-functional group in a native or a surface-functionalized textile substrate such as one including cellulosic fibers). In another refinement, the textile article is in the form of a personal garment or a component thereof (e.g., shirts, pants, socks, undergarments, gloves, hats, coats, etc.). In another refinement, the textile article is in the form of a furnishing or component thereof (e.g., for a residential (home) dwelling or other building, such as furniture (upholstery, interior component), curtains, drapery, window shades, carpeting, rugs, etc.). In another refinement, the cured polysilyl phosphate compound coating is incorporated into the textile article in an amount sufficient to provide a phosphorous-based intumescent flame retardancy to the textile article relative to the textile substrate without the coating.

In another aspect, the disclosure relates to a process for curing a curable polysilyl phosphate compound, the process comprising: (a) providing a curable polysilyl phosphate compound or composition according to any of the various disclosed embodiments, and (b) hydrolyzing the curable polysilyl phosphate compound with water, thereby converting at least some of the hydrolysable silyl groups to silanol groups in the curable polysilyl phosphate compound (e.g., some or all of the hydrolysable silyl groups are hydrolyzed to form corresponding silanol groups (—SiX converted to —SiOH) groups capable of subsequent condensation); (c) curing the curable polysilyl phosphate compound, thereby condensing at least some of the silanol groups to form a cured polysilyl phosphate compound comprising covalent intermolecular siloxane crosslinks in the cured polysilyl phosphate compound (e.g., forming a networked polymer as the cured compound).

Various refinements and extensions of the disclosed processes are possible. For example, providing the curable polysilyl phosphate compound in part (a) can comprise providing a mixture comprising: (i) the curable polysilyl phosphate compound, (ii) an organic solvent for the curable polysilyl phosphate compound (e.g., an alcohol (such as methanol, ethanol, (iso)propanol), THF, acetone, etc.), (iii) water, (iv) a catalyst (e.g., an acid catalyst to maintain a pH value during hydrolysis/condensation of at least 2 or 3 and/or up to about 4, 5, or 6; specific acids can include carboxylic acids (such as formic acid, acetic acid, and/or lactic acid) and mineral acids (such as phosphoric acid, nitric acid, and/or hydrochloric acid)), and (v) optionally a silane crosslinker (e.g., represented by the form $Si(R_4)_{4-y}X_y$, where X and $R_4$ are as described above, except that y is selected to be 2, 3, or 4). In an embodiment, the process further comprises: applying the hydrolyzed curable polysilyl phosphate compound from part (b) to a textile substrate; and performing the curing of the curable polysilyl phosphate compound in part (c) on the substrate, thereby forming the cured polysilyl phosphate compound as a coating on the textile substrate and bonded thereto (e.g., at least some curing/condensation performed in presence of substrate, where some additional curing/condensation may occur prior to application of the hydrolyzed curable polysilyl phosphate compound to the substrate).

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein.

Figure 1:
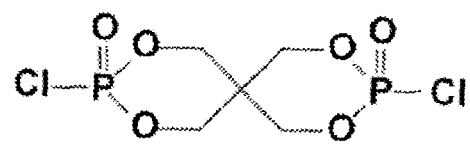
FIG. 1 illustrates the structure of spirocyclic pentaerythritol diphosphoryl chloride (SPDPC).

While the disclosed compositions, articles, and methods are susceptible embodiments in various forms, specific embodiments of the disclosure are illustrated in the drawings (and will hereafter be described) with the understanding that the disclosure is intended to be illustrative, and is not intended to limit the claims to the specific embodiments described and illustrated herein.

DETAILED DESCRIPTION

The disclosure relates to curable polysilyl phosphate compounds and compositions as well as related methods and flame-retardant textiles incorporating the same. Curable polysilyl phosphate compounds according to the disclosure include a hydrocarbon moiety comprising at least one phosphate group and more than two hydrolysable silyl groups linked to the hydrocarbon moiety. In some embodiments, the hydrocarbon moiety is derived from spirocyclic pentaerythritol diphosphoryl chloride. The curable polysilyl phosphate compound can applied to a textile substrate and then cured to provide a flame-retardant textile with the cured polysilyl phosphate compound as a coating bonded to the textile substrate.

In an effort to address the above concerns, the current disclosure is aimed at developing new non-halogenic eco-friendly intumescent flame retardant chemistry and applies it on textile substrates to make a flame retardant textile substrate. A phosphorous-based flame retardant is provided that eliminates the health hazards caused by the presence of halogen compounds, especially bromine-based compounds. A new technique to attach the phosphorous-based flame retardant to the textile substrate is disclosed. Specifically, cotton, nylon and other common fibers can be used with a silane-based system to make the finish durable to normal laundering.

Over the years a considerable amount of work has been done to explore the potential of intumescent flame retardant fiber combinations to produce flame retardant effects in textile materials. With regard to the use of the established intumescent based on ammonium polyphosphate, melamine phosphate, and pentaerythritol derivatives, two major drawbacks are evident within the fiber and textile areas. First, they can only be applied as a fibrous surface treatment in a bonding resin which affects desirable textiles properties such as appearance, hand and stiffness. Second, and perhaps of greater importance even for applications whose aesthetics are less important, are their relatively high solubility in water hence poor fastness to laundering. Ideally, the intumescent should be integrated within the fiber structure at the molecular level. As a consequence, attempts to develop substantive intumescent treatments for cellulose and other fibers, including flame retardant cellulose, polyamide-6, polyamide-6,6, and wool have been the focus of intense research.

Spirocyclic pentaerythritol bisphosphorate diphosphoryl chloride (SPDPC) is a cyclic structure with phosphorous atom attached to its structure (FIG. 1). Phosphorus present in the cyclic structure of SPDPC plays a vital role in imparting flame retardant properties to the compound. It is proposed therefore that polyol phosphonyl chlorides like SPDPC will substitute active hydrogens present in fiber forming molecules and thereby introduce a substituent which is both a char promoter and a char former. In turn, this will decompose via a liquid intermediate phase following release of phosphoric acid as the monomeric or polymeric or polymeric form. The present disclosure provides an SPDPC-based intumescent compound and attaches it to a textile substrate using a highly durable method which does not stiffen the fabric nor significantly alter its textile properties.

Curable Polysilyl Phosphate Composition

A curable polysilyl phosphate or polysilyl phosphorous-containing compound according to the disclosure includes a hydrocarbon moiety with at least 1 phosphate or other phosphorous-based flame retardant/intumescent group, for example a flame-retardant phosphate ($PO_4$) group such as where the three oxygen atoms single bonded to the phosphorous atom in the phosphate group ($P(=O)(O\cdot)_3$) are linked to carbon atoms in (heteroatom-substituted) hydrocarbon groups containing 1 to 50 carbon atoms via covalent bonds (e.g., and not ionic bonds). More generally, the phosphorous-containing flame retardant/intumescent groups can include any combination of phosphates, phosphonates, phosphinates, and esters thereof (e.g., $P(=O)(O\cdot)_3$, $P(=O)(OR)_3$, $P(=O)(R)(O\cdot)_2$, $P(=O)(R)(OR)_2$, $P(=O)(R)_2(O\cdot)$, and $P(=O)(R)_2(OR)$, respectively; where R can be the same or different (heteroatom-substituted) hydrocarbon groups containing 1 to 50 carbon atoms noted above within a given phosphorous-containing group). Description herein to curable/cured polysilyl phosphate compounds applies more generally to polysilyl phosphorous-containing compounds as well. The curable polysilyl phosphate compound further includes more than 2 hydrolysable silyl groups linked to the hydrocarbon moiety (e.g., via one or more carbamate linking groups between the hydrocarbon moiety and the hydrolysable silyl groups, with or without further linking groups such as (heteroatom-substituted) hydrocarbon groups containing 1 to 50 carbon atoms). Suitably, the curable polysilyl phosphate compound is halogen-free (e.g., free or substantially free from added F, Cl, Br, I, and/or At).

In one aspect, the disclosure relates to a curable polysilyl phosphate composition including a curable polysilyl phosphate compound represented by the following structure (I):

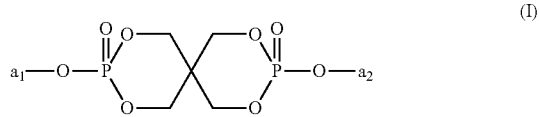

In structure (I), (i) $a_1$ and $a_2$ are the same or different and each is represented by the following structure (II):

(ii) $A_1$ is represented by $—R_1—Si(R_4)_{3-y}X_y$; (iii) $A_2$ is represented by $—R_2—Si(R_4)_{3-z}X_z$ or H or $R_4$; (iv) X is a hydrolysable group independently selected from the group consisting of alkoxy groups, aryloxy groups, carboxyloxy groups, halogens, and combinations thereof; (v) $R_1$, $R_2$, and $R_3$ are independently selected from the group consisting of hydrocarbons containing from 1 to 20 carbon atoms and heteroatom-substituted hydrocarbons containing from 1 to 20 carbon atoms; (vi) $R_4$ is independently selected from the group consisting of H, hydrocarbons containing from 1 to 20 carbon atoms, and heteroatom-substituted hydrocarbons containing from 1 to 20 carbon atoms; (vii) y is 1,2, or 3; (viii) z is 1, 2, or 3 when $A_2$ is not H or $R_4$; and (ix) the curable polysilyl phosphate compound has a number of hydrolysable groups X of at least 4 (e.g., X ranging from 6 to 12). In an embodiment, the composition further includes oligomeric analogs to the curable polysilyl phosphate compound according to structure (I) (e.g., containing 2 to 10 spirocyclic pentaerythritol bisphosphorate linked together via hydrocarbon groups such as $R_3$ and having terminal $a_1$ and $a_2$ groups at opposing ends of the oligomeric chain).

The hydrolysable silyl groups include functional groups attached to a silicon atom (e.g., 1, 2, or 3 functional hydrolysable silyl groups per silicon atom) that can be hydrolyzed under suitable conditions (e.g., when in contact with water, such as under acidic conditions) to form corresponding silanol (Si—OH) functional groups, which in turn can be condensed to form siloxane (Si—O—Si) functional groups/linkages in a cured polysilyl phosphate compound coating. The hydrolysable silyl group can include a hydrocarbon group linked via an oxygen atom to a silicon atom (e.g., Si—OR, such as alkoxy groups having 1, 2, 3, or 4 carbon atoms) and/or a halogen atom linked to a silicon atom (e.g., Si—X, such as for F, Cl, Br, or I). Examples of specific hydrolysable silyl groups include silicon-bound methoxy groups and/or ethoxy groups. The hydrolysable silyl groups are generally all the same to promote a uniform rate of hydrolysis/condensation, but the specific groups can be different in an embodiment if desired to have a distribution of different hydrolysis/condensation (e.g., a curable polysilyl phosphate compound including some methoxy groups and some ethoxy groups). In different embodiments, the curable polysilyl phosphate compound can include at least 4, 6, 7, 8, 9, 12 and/or up to 12, 18, or 24 hydrolysable silyl groups, depending on the number of silicon atoms included and the degree of functionality of each silicon atom.

The hydrocarbon groups/moieties in the various components of the curable polysilyl phosphate compound (e.g., as illustrated in Structure I or otherwise) generally can include saturated or unsaturated, linear or branched aliphatic hydrocarbon groups, alicyclic hydrocarbon groups, aryl hydrocarbon groups, and heteroatom-including analogs/derivates of the same (e.g., including N, O, S heteroatoms). The hydrocarbon groups (R, $R_1$, $R_2$, $R_3$, or $R_4$) additionally can include hydrolysable silyl groups (i.e., in addition to those explicitly illustrated in $A_1$ and $A_2$). As noted above, the hydrolysable X groups can be the same in all instances in the curable polysilyl phosphate compound to promote uniform hydrolysis and condensation rates, but they can be different in alternate embodiments.

The disclosed curable polysilyl phosphate compound has a high reactivity (e.g., promoting rapid and extensive curing). The specific chemical structure and functional groups of the curable polysilyl phosphate compound can be selected and synthesized by reaction between one or more isocyanatosilanes (e.g., isocyanatoalkyl[mono-, di-, or tri-]alkoxysilanes) with one or more polyols (polyhydroxyl compounds) incorporating the phosphate- (or phosphorous-) containing hydrocarbon moiety (e.g., a bis-polyol of SPDPC), for example in equivalent (molar) proportions based on the hydroxyl and isocyanate functional groups, to yield polysilyl phosphate compounds. Thus, the polysilyl phosphate compound has a structure corresponding to a reaction product resulting from an carbamate-forming reaction of the polyisocyanate with the polyol.

Suitable isocyanatosilanes useable as a precursor to the hydrolysable silyl groups of the curable polysilyl phosphate compound include any organic compound having one or more isocyanate groups and one or more hydrolysable silyl groups per molecule (e.g., 1, 2, 3, 4, 5, or 6 hydrolysable silyl groups with 1 or 2 corresponding silicon atoms). The isocyanatosilanes are suitably monoisocyanates. The isocyanatosilanes can have a hydrocarbon group having at least 1 or 2 and/or up to 6 or 10 carbon atoms that links the isocyanate group with the hydrolysable silyl groups (e.g., with the isocyanate group and the corresponding silicon atom at opposing terminal ends of the linking group). The isocyanatosilanes are suitably monoisocyanates can be represented by the form OCN-$A_1$, where $A_1$, X, and $R_1$-$R_4$ are as described above for the curable polysilyl phosphate compound. Specific examples of suitable isocyanatosilanes include (3-isocyanatopropyl)trimethoxysilane and (3-isocyanatopropyl)triethoxysilane as illustrative suitable (ω-isocyanatoalkyl)alkoxysilanes such as with alkyl and alkoxy groups having at least 1 or 2 and/or up to 4, 6, 8, or 10 carbon atoms.

Curing Process

The curable polysilyl phosphate (or polysilyl phosphorous-containing) compound in any of the various embodiments to the disclosure can be cured with water to form a cured polysilyl phosphate compound having covalent intermolecular siloxane crosslinks in the networked polymer product. The intermolecular crosslinks relate to the formation of covalent bonds between originally separate curable polysilyl phosphate molecules. In some instances, intramolecular crosslinking is possible in the networked polymer product as well. The curing process generally involves a serial, two-step mechanism in which at least some of the hydrolysable silyl groups in the curable polysilyl phosphate compound are first hydrolyzed to silanol groups (e.g., generally an acid-catalyzed aqueous reaction), and the silanol groups are then condensed to form intermolecular siloxane crosslinks. Condensation/crosslinking to form a siloxane link can occur between two silanol groups (e.g., to yield water as a byproduct) or between a silanol group and an unhydrolyzed silyl group from the curable polysilyl phosphate compound (e.g., to yield a corresponding alcohol from an alkoxy hydrolysable group or a corresponding acid form a halogen hydrolysable group). The resulting networked polymer includes a silica network sol with individual units linked via the phosphate-containing hydrocarbon moiety of the curable polysilyl phosphate compound (e.g., including siloxane cage-like structures).

In an extension of the curing process that further involves the coating of the polysilyl phosphate compound onto a textile substrate, the curable polysilyl phosphate compound can be first partially cured (e.g., partially, substantially, or completely hydrolyzed but without partial, substantial, or complete condensation) in the absence of the substrate. The partially cured polysilyl phosphate compound is then applied to the substrate by any convenient means (e.g., dipping, immersing, spraying, coating, etc. the substrate with a solution/mixture including the partially cured polysilyl phosphate compound). Once applied, the partially cured polysilyl phosphate compound on the substrate continues to cure (e.g., including further hydrolysis where appropriate as well as condensation for network polymer formation), thereby forming the cured polysilyl phosphate compound as a coating on the substrate. Once applied to the substrate and after substantial evaporation of water and any organic solvent, a rapid and high degree of condensation is desirable to obtain films with good barrier properties. The rates of such gel-formation reactions are a function of temperature, among other factors. Suitably, the post-application cure can be performed at ambient temperature (e.g., 20° C. to 30° C.) or at higher temperatures (e.g., ambient temperature up to 50° C., 75° C., 100° C., 150° C., or 200° C.).

In a general curing process according to the disclosure, the curable polysilyl phosphate compound is initially hydrolyzed to form a silanol analog to the curable polysilyl phosphate compound, and the silanol groups then condense to form intermolecular crosslinks in a networked polymer product (e.g., as a coating on a substrate). The silanol analog can be represented by the above Structure I, where some, most, or all of the hydrolysable groups X are replaced by OH (e.g., at least 50%, 60%, 70% or 80% and/or up to 80%, 90%, 95% or 100% on a number or molar basis are hydrolyzed). The curable polysilyl phosphate compound can be at least partially hydrolyzed prior to coating or other contact with an intended substrate (e.g., textile substrate). After an initial pre-hydrolysis period (or induction period) prior to substrate contact, the (partially) hydrolyzed polysilyl phosphate compound continues to hydrolyze and condense on the substrate to form an adherent polymer coating (e.g., covalently bonded thereto).

The curable polysilyl phosphate compound is suitably provided in the form of an aqueous mixture that serves as an initial pre-hydrolysis (induction) medium as well as a coating/dipping solution for subsequent substrate application. In addition to water and the curable polysilyl phosphate compound, the aqueous mixture can further include an organic solvent for the curable polysilyl phosphate compound, a (hydrolysis) catalyst, and a silane crosslinker. Suitable amounts for the various mixture components relative to the mixture as a whole can include: at least 5 wt. % or 10 wt. % and/or up to 30 wt. % or 40 wt. % for the curable polysilyl phosphate compound, at least 2 wt. % or 10 wt. % and/or up to 50 wt. % or 70 wt. % for water, at least 10 wt. % or 20 wt. % and/or up to 50 wt. % or 50 wt. % for the organic solvent, at least 0.5 wt. % or 1 wt. % and/or up to 3 wt. % or 5 wt. % for the catalyst.

The addition of a water-miscible organic solvent that is compatible (e.g., capable of solvating) the curable polysilyl phosphate compound can provide sufficient phase stability to the mixture and can control the equilibrium reaction rates in the curing system. The water/solvent ratio in the mixture can be selected to control the properties of the resulting coating. The solvent is suitably an alcohol such as methanol, ethanol, (iso)propanol, and mixtures thereof. The particular alcohol solvent can be selected to correspond to the alcohol that is liberated from the curable polysilyl phosphate compound upon hydrolysis (e.g., an alcohol corresponding to the alkoxy group on the silicon atom). Other non-alcohol solvents that are water-miscible and compatible with polysilyl phosphate precursor also can be used, for example including acetone and/or tetrahydrofuran (THF).

The catalyst added to the mixture is suitably a Bronsted acid, for example a carboxylic acid such as formic acid, acetic acid, and/or lactic acid. Alternatively or additionally, stronger mineral acids such as phosphoric acid, nitric acid, and/or hydrochloric acid can be used. The catalyst suitably is added to the mixture in an amount to achieve an acidic pH value to be maintained during induction/coating, for example of at least 2 or 3 and/or up to about 4, 5, or 6.

In some embodiments, the curable polysilyl phosphate compound is the only source of intermolecular siloxane crosslinks in the reaction mixture and in the resulting cured polysilyl phosphate compound (e.g., the reaction mixture is free or substantially free from other added species having hydrolysable silyl groups). It can be desirable to have only a single chemical species in the mixture that contains hydrolysable silyl groups to promote uniformity of the curing reactions in the system. Alternatively or additionally, the mixture can be free from other added sources of silicon, whether in the form of hydrolysable silyl groups, cured siloxane crosslinks, or otherwise. In other embodiments, however, the reaction mixture can include a silane crosslinker to increase the crosslink density and barrier properties in the resulting cured polymer coating. Suitable silane crosslinkers can be represented by the form $Si(R_3)_{4-y}X_y$, where X and $R_3$ are as described above for the curable polysilyl phosphate compound, except that y is selected to be 2, 3, or 4. Examples of suitable silane crosslinkers include tetraethoxyorthosilicate (TEOS) and tetramethoxyorthosilicate (TMOS). Because of the potentially differing rates of hydrolysis between the silane crosslinker and the curable polysilyl phosphate compound, the silane crosslinker can be pre-hydrolyzed to a desired degree in a separate aqueous reaction mixture (i.e., which does not contain the curable polysilyl phosphate compound), and then the (partially) hydrolyzed silane crosslinker is added to the reaction mixture containing the curable polysilyl phosphate compound for its pre-hydrolysis (induction) period. While the inclusion of the silane crosslinker generally involves an initial reaction/process step, it can provide a resulting cured polysilyl phosphate compound with improved structural properties.

Coated Textile Article

A coated textile article according to the disclosure includes a textile substrate having a cured polysilyl phosphate (or polysilyl phosphorous-containing) compound as a coating on a surface (e.g., outer surface) of the substrate 110. The cured coating (e.g., as formed by the above method) suitably has a thickness ranging from 1 µm or 2 µm to 5 µm or 10 µm for a single coating application, and multiple coatings applied/cured in series can form a correspondingly thicker coating if desired.

The textile substrate is not particularly limited, but it is suitably an animal textile (e.g., protein-based fibers, including hair or fur such as wool, silk, etc.), a plant textile (e.g., cellulosic fibers; such as cotton, jute, flax, hemp, etc.), a mineral textile, or a synthetic textile (e.g., polymeric fibers such as polyester, aramid, acrylic, polyamide (nylon), polyurethane, polyolefin, etc. fibers). In an embodiment, the textile substrate includes cellulosic fibers, for example one or more cellulosic fibers such as cotton, jute, flax, hemp, sisal, ramie, straw, and bamboo. In some embodiments, the cured polysilyl phosphate compound is bonded to the textile substrate via one or more of covalent bonds, hydrogen bonds, and van der Waals forces (e.g., bonding forces with the substrate can be between the silyl groups or other functional groups (e.g., carbamate linking groups) of the polysilyl phosphate compound). For example, the cured polysilyl phosphate compound can covalently bonded to the textile substrate via a —SiO— functional group (e.g., a —SiOC— group such as resulting from a condensation from a —SiOH silanol group in an at least partially hydrolyzed curable polysilyl phosphate compound and a —COH hydroxyl/alcohol group, such as may be present as a surface-functional group in a native or a surface-functionalized textile substrate such as one including cellulosic fibers).

The textile article can take any of a variety of forms. For example, the textile article can be in the form of a personal garment or a component thereof (e.g., shirts, pants, socks, undergarments, gloves, hats, coats, etc.). In another embodiment, the textile article can be in the form of a furnishing or component thereof (e.g., for a residential (home) dwelling or other building, such as furniture (upholstery, interior component), curtains, drapery, window shades, carpeting, rugs, etc.). In another embodiment, the cured polysilyl phosphate compound coating is incorporated into the textile article in an amount sufficient to provide a phosphorous-based intumescent flame retardancy to the textile article relative to the textile substrate without the coating.

Mannari U.S. Publication No. 2012/0258319 provides additional disclosure related to hydrolysable and condensable silane compositions and is incorporated by reference herein in its entirety.

EXAMPLES

The following examples illustrate the disclosed processes and compositions, but are not intended to limit the scope of any claims thereto.

In the examples, the following steps are used to create a fire retardant finish on a textile substrate: (1) spirocyclic pentaerythritol diphosphoryl chloride (SPDPC), (2) synthesis of bis-diglycol spirocyclic pentaerythritol bisphosphorate (BSPB), (3) synthesis of bis-silane derivative of BSPB, and (4) formation of a sol gel containing an intumescent finish as a coating on a textile substrate. The finish is applicable to cotton, nylon, silk, wool and other textile fabric substrates to provide highly flame retardant fabrics.

Figure 2:
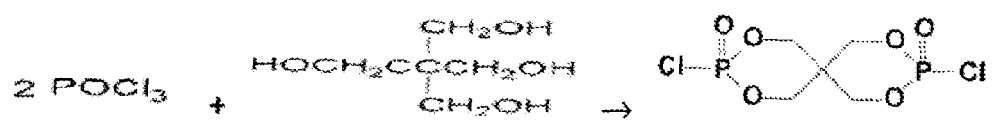
FIG. 2 illustrates the reaction schematic for the formation of SPDPC.

Preparation of SPDPC:

SPDPC was prepared from phosphorous (V) oxychloride ($POCl_3$) and pentaerythritol ($C(CH_2OH)_4$) leading to the formation of SPDPC with P—Cl bonds as shown in FIG. 2. Reaction between pentaerythritol and phosphorous (V) oxychloride was carried out in molar ratio of 0.5:3.5. These two chemicals were added in a three-neck glass reactor. Nitrogen gas, a temperature controller, and a condenser were connected to the reactor. A magnetic stirrer was used to stir the mixture with gradual drop-by-drop addition of phosphorous (V) oxychloride to pentaerythritol. The temperature was gradually increased to 80° C. using an oil heated heating system. The reaction was continued at 80° C. for 2 hours. The temperature was then further raised to 115° C. gradually and held for 20 hours. A semi-viscous white mass was collected at the end of the reaction. The product was washed four times with diethyl ether and acetone.

Figure 3:
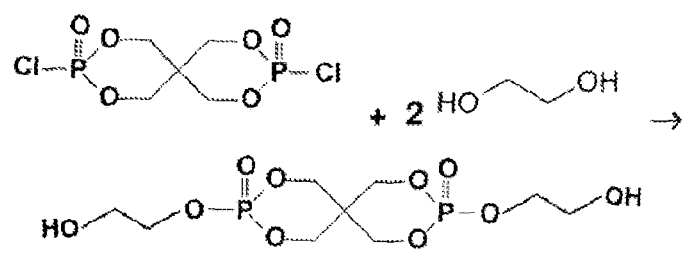
FIG. 3 illustrates the reaction schematic for the formation of bis-diglycol spirocyclic pentaerythritol bisphosphorate (BSPB).
Figure 4:
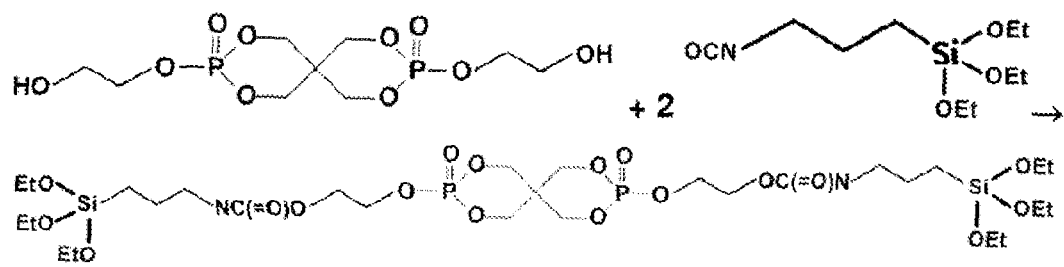
FIG. 4 illustrates the reaction schematic for formation of a curable polysilyl phosphate compound according to the disclosure and based on SPDPC.

Preparation of BSPB:

Bis-diglycol spirocyclic pentaerythritol bisphosphorate (BSPB) was produced by reacting SPDPC with ethylene glycol as shown in FIG. 3. SPDPC was reacted with ethylene glycol at a molar ratio 0.1:0.25 (i.e., a slight stoichiometric excess for the formation of monomeric BSPB as illustrated) to produce BSPB. The solution was synthesized in a three-neck glass reactor. Nitrogen gas, a temperature controller, and a condenser were connected to the reactor. A magnetic stirrer was used for stirring, and the mixture was heated gradually to 80° C. and the held there for 6 hours. The temperature then was further raised to 130° C., and the reaction mixture was held there for 4 hours. The reaction system was cooled and the product was washed with diethyl ether and acetone to obtain white powder. The product was further dried under vacuum at 40° C. for 1 hour.

Preparation of Bis-Silane:

Bis-silane was synthesized in two steps: (1) reaction of SPDPC with ethylene glycol to form BSPB (described above), followed by (2) reaction of BSPB with an isocyanatotriethoxysilane in the molar ratio of 1:2. In step 2, BSPB was reacted with (3-isocyanatopropyl) triethoxysilane (CPTES). Dibutyltin dilaurate was used as a catalyst for the second reaction. The second reaction was performed in a three-neck glass reactor in the nitrogen environment under temperature control. The reaction mixture was gradually heated to 60° C. for 4 hours. The reaction mixture was then cooled down to room temperature and tested for the formation of the bis-silane condensation product using Fourier transformation infrared (FTIR) spectroscopy.

Preparation of Sol-Gel:

The bis-silane was mixed with water and ethanol (water: ethanol ratio ranging from about 1:1.05 to 1:2) to produce a sol-gel. Acetic acid was added to the mixture to maintain a pH value between about 3-4 and to provide an acid catalyst for the hydrolysis of the silyl ethoxy groups in the bis-silane (i.e., converting at least some of the —SiOEt hydrolysable alkoxy groups to —SiOH condensable silanol groups). The reacting mixture was stirred at 450 rpm using magnetic stirrer for 15 minutes to produce the sol-gel.

Application of Sol-Gel to Textiles:

The intumescent fire-retardant coating was attached to a textile fabric substrates including cotton and nylon by applying the sol-gel to the substrate using a dip-pad-cure method as follows: The mangle pressure on the padder was adjusted to 25 psi, and the fabric substrate was treated with 4 dips and 4 nips. After dip and nip, the fabric was dried in an oven at 60° C. for 10 minutes. Finally, dried fabric was cured at 115° C. for 6 minutes in an air-drying oven to promote/complete condensation reactions forming (i) intermolecular siloxane crosslinks within the sol-gel and resulting polymer and (ii) covalent —SiOC— bonds attaching the coating to the fabric substrate (in the case of the cellulosic cotton substrate having silanol-reactive surface —COH groups).

Figure 5:
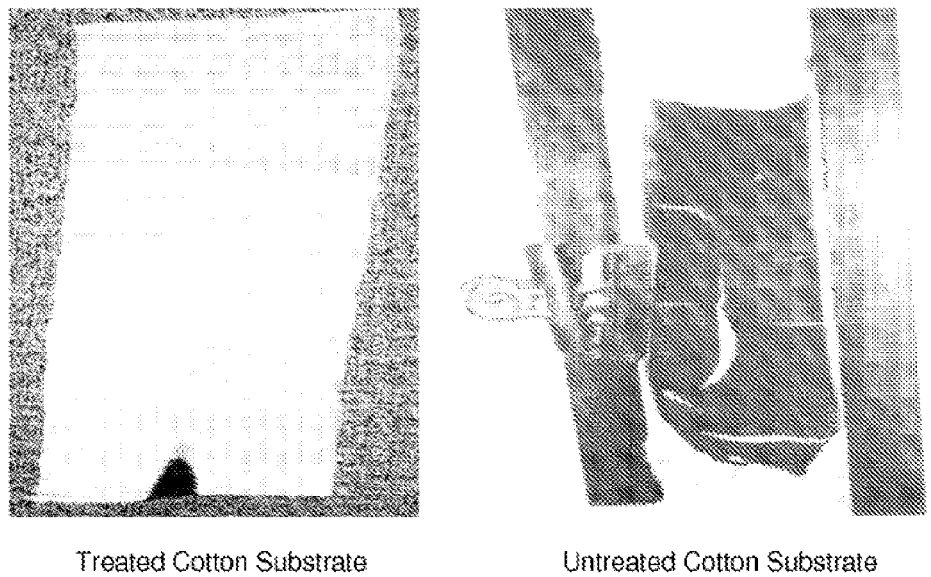
FIG. 5 illustrates flammability testing results for a cotton substrate treated according to the disclosure (left) and an untreated cotton substrate (right).

Flammability Evaluation of Fabric Treated with Intumescent Finish:

Coated cotton fabric was tested for flame retardancy in a vertical flammability tester using ASTM D6413-99 method. Both treated and untreated cotton samples of 12" length were tested. The untreated sample totally burnt into char (destroyed) within a few seconds. The treated sample extinguished the flame in 10 seconds with a char length of 0.75" and without any afterglow. FIG. 5 illustrates the differences in flame resistance for the cotton substrates. A similar test was conducted using nylon fabric according to the ASTM D6413 method using 12" specimens, both treated and untreated. In this test, the untreated sample was burnt into char completely while the treated specimen glowed for 4 seconds and had a char length of only 0.5" before extinguishing the flame.

Figure 6:
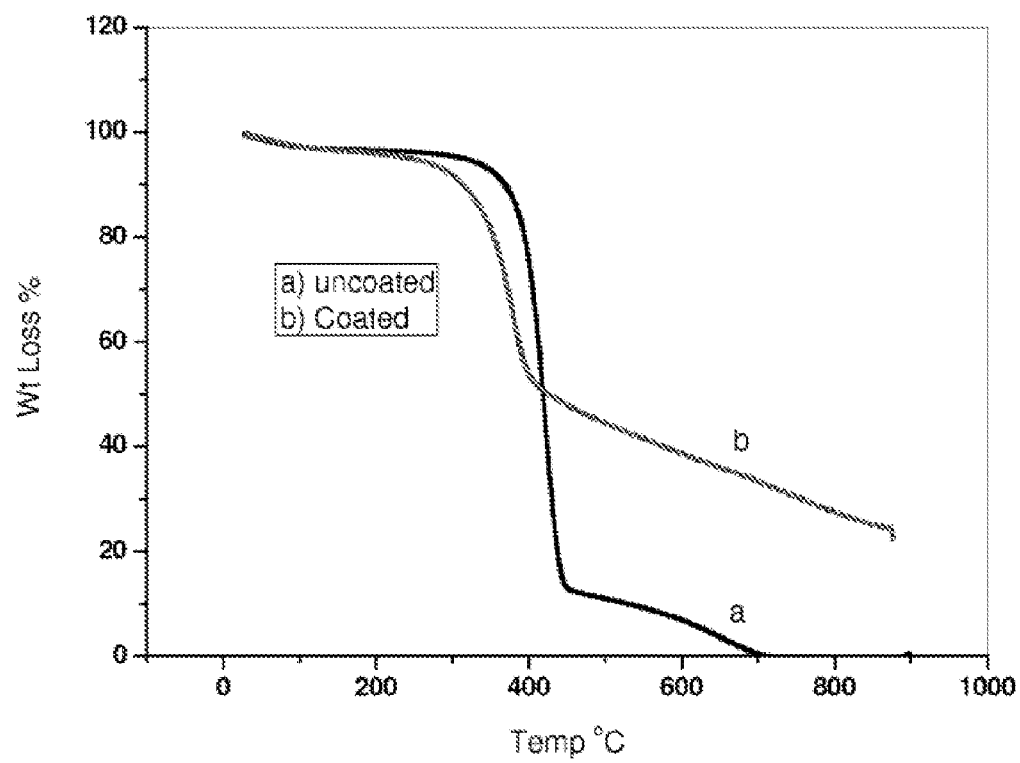
FIG. 6 illustrates thermo gravimetric analysis (TGA) thermograms showing the relative substrate weight as a function of temperature for (i) the treated cotton substrate sample with the fire-retardant finish and (ii) the untreated cotton substrate sample.

Thermo Gravimetric Analysis (TGA):

FIG. 6 illustrates the TGA thermograms of the treated cotton substrate sample with the fire-retardant finish and the untreated cotton substrate sample. The TGA thermograms indicate that coated sample lost weight at a slower rate than the uncoated sample due to thermal degradation. The uncoated sample lost no weight until about 380° C., and then abruptly started thermal degradation at about 420° C., which is the degradation temperature of cotton. The uncoated sample was completely degraded at about 700° C. The coated sample started weight loss at about 360° C., and then followed a steady weight loss (i.e., unlike the abrupt degradation of the uncoated cotton sample). The coated sample did not degrade completely until about 900° C. The results indicate that the sample coated with the flame retardant is thermally more stable than the uncoated cotton sample.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A curable polysilyl phosphate composition comprising:
   (a) a curable polysilyl phosphate compound represented by the following structure (I):

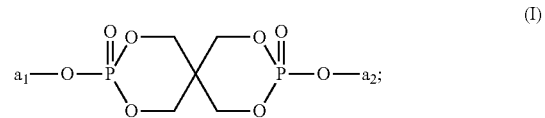

(I)

wherein:
   (i) $a_1$ and $a_2$ are the same or different and each is represented by the following structure (II):

$$—R_3—O—C(=O)—NA_1A_2;$$ (II)

(ii) $A_1$ is represented by $—R_1—Si(R_4)_{3-y}X_y$;
   (iii) $A_2$ is represented by $—R_2—Si(R_4)_{3-z}X_z$ or H or $R_4$;
   (iv) X is a hydrolysable group independently selected from the group consisting of alkoxy groups, aryloxy groups, carboxyloxy groups, halogens, and combinations thereof;
   (v) $R_1$, $R_2$, and $R_3$ are independently selected from the group consisting of hydrocarbons containing from 1 to 20 carbon atoms and heteroatom-substituted hydrocarbons containing from 1 to 20 carbon atoms;
   (vi) $R_4$ is independently selected from the group consisting of H, hydrocarbons containing from 1 to 20 carbon atoms, and heteroatom-substituted hydrocarbons containing from 1 to 20 carbon atoms;
   (vii) y is 1, 2, or 3;
   (viii) z is 1, 2, or 3 when $A_2$ is not H or $R_4$; and
   (ix) the curable polysilyl phosphate compound has a number of hydrolysable groups X of at least 4.

2. The composition of claim 1, wherein:
   (i) $A_1$ is $—C_3H_6—Si(OCH_3)_3$ or $—C_3H_6—Si(OC_2H_5)_3$;
   (ii) $A_2$ is H; and
   (iii) $R_3$ is $—C_2H_4—$.

3. The composition of claim 1, wherein the hydrolysable silyl groups X are selected from the group consisting of methoxy groups, ethoxy groups, and combinations thereof.

4. The composition of claim 1, wherein the number of hydrolysable groups X ranges from 6 to 12.

5. The composition of claim 1, further comprising:
   (b) oligomeric analogs to the curable polysilyl phosphate compound according to structure (I).

6. A curable polysilyl phosphate compound comprising:
   (a) a hydrocarbon moiety comprising at least 2 phosphate groups linked to one or more of hydrocarbon groups containing from 1 to 50 carbon atoms and heteroatom-substituted hydrocarbon groups containing from 1 to 50 carbon atoms; and
   (b) more than 2 hydrolysable silyl groups linked to the hydrocarbon moiety;
wherein:
   (i) the hydrocarbon moiety is represented by $—R_a—PO_4—R_b—PO_4—R_a—$;
   (ii) $PO_4$ are the phosphate groups;
   (iii) $R_a$ are the same or different hydrocarbon groups or heteroatom-substituted hydrocarbon groups providing attachment points for the hydrolysable silyl groups linked to the hydrocarbon moiety; and
   (iv) $R_b$ is a hydrocarbon group or a heteroatom-substituted hydrocarbon group linking the phosphate groups together.

7. The compound of claim 6, wherein the hydrolysable silyl groups are selected from the group consisting of methoxy groups, ethoxy groups, and combinations thereof bound to one or more silicon atoms.

8. The compound of claim 6, wherein the curable polysilyl phosphate compound has a number of hydrolysable silyl groups ranging from 4 to 24.

9. The compound of claim 6, wherein the hydrocarbon moiety comprises the following structure (III):

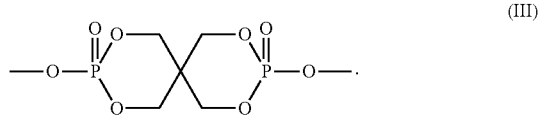

(III)

10. The compound of claim 6, wherein:
(i) the curable polysilyl phosphate compound is represented by the following structure (I):

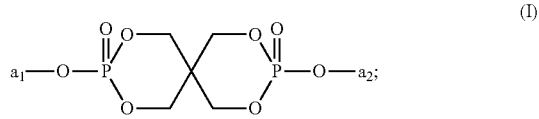

(I)

(ii) $a_1$ and $a_2$ are the same or different and each comprises at least 1 hydrolysable silyl group.

11. The compound of claim 10, wherein:
(i) each of $a_1$ and $a_2$ comprises a terminal hydrolysable silyl group represented by —Si(R$_4$)$_{3-y}$X$_y$;
(ii) each X is a hydrolysable group independently selected from the group consisting of alkoxy groups, aryloxy groups, carboxyloxy groups, and halogens;
(iii) each $R_4$ is independently selected from the group consisting of H, hydrocarbons containing from 1 to 20 carbon atoms, and heteroatom-substituted hydrocarbons containing from 1 to 20 carbon atoms;
(iv) y is 1, 2, or 3; and
(v) $a_1$ and $a_2$ can be selected such that X, $R_4$, and y are the same or different between $a_1$ and $a_2$ provided that the total number hydrolysable groups X is more than 2.

12. The compound of claim 11, wherein each of $a_1$ and $a_2$ further comprises a carbamate linking group between the respective phosphate group and terminal hydrolysable silyl group.

13. The compound of claim 10, wherein:
(i) each of $a_1$ and $a_2$ is represented by the following structure (II):

(II)

(ii) $A_1$ is represented by —R$_1$—Si(R$_4$)$_{3-y}$X$_y$;
(iii) $A_2$ is represented by —R$_2$—Si(R$_4$)$_{3-z}$X$_z$ or H or $R_4$;

(iv) X is a hydrolysable group independently selected from the group consisting of alkoxy groups, aryloxy groups, carboxyloxy groups, halogens, and combinations thereof;
(v) $R_1$, $R_2$, and $R_3$ are independently selected from the group consisting of hydrocarbons containing from 1 to 20 carbon atoms and heteroatom-substituted hydrocarbons containing from 1 to 20 carbon atoms;
(vi) $R_4$ is independently selected from the group consisting of H, hydrocarbons containing from 1 to 20 carbon atoms, and heteroatom-substituted hydrocarbons containing from 1 to 20 carbon atoms;
(vii) y is 1, 2, or 3;
(viii) z is 1, 2, or 3 when $A_2$ is not H or $R_4$; and
(ix) the number of hydrolysable groups X is more than 2.

14. The compound of claim 13, wherein:
(i) $A_1$ is —C$_3$H$_6$—Si(OCH$_3$)$_3$ or —C$_3$H$_6$—Si(OC$_2$H$_5$)$_3$;
(ii) $A_2$ is H; and
(iii) $R_3$ is —C$_2$H$_4$—.

15. The compound of claim 6, wherein the curable polysilyl phosphate compound is halogen-free.

16. The compound of claim 6, wherein the curable polysilyl phosphate compound has a structure corresponding to a reaction product resulting from reaction of a bis-dipolyol spirocyclic pentaerythritol bisphosphorate (BSPB) with an isocyanato silane.

17. A process for curing a curable polysilyl phosphate compound, the process comprising:
(a) providing a curable polysilyl phosphate compound according to claim 6;
(b) hydrolyzing the curable polysilyl phosphate compound with water, thereby converting at least some of the hydrolysable silyl groups to silanol groups in the curable polysilyl phosphate compound; and
(c) curing the curable polysilyl phosphate compound, thereby condensing at least some of the silanol groups to form a cured polysilyl phosphate compound comprising covalent intermolecular siloxane crosslinks in the cured polysilyl phosphate compound.

18. The process of claim 17, wherein providing the curable polysilyl phosphate compound in part (a) comprises providing a mixture comprising: (i) the curable polysilyl phosphate compound, (ii) an organic solvent for the curable polysilyl phosphate compound, (iii) water, (iv) a catalyst, and (v) optionally a silane crosslinker.

19. The process of claim 17, further comprising:
applying the hydrolyzed curable polysilyl phosphate compound from part (b) to a textile substrate; and
performing the curing of the curable polysilyl phosphate compound in part (c) on the substrate, thereby forming the cured polysilyl phosphate compound as a coating on the textile substrate and bonded thereto.

* * * * *